United States Patent

Brow et al.

[11] Patent Number: 6,048,809
[45] Date of Patent: Apr. 11, 2000

[54] VEHICLE HEADLINER FORMED OF POLYESTER FIBERS

[75] Inventors: Mark J. Brow, Allen Park; Philip L. Guthrie, Farmington Hills, both of Mich.

[73] Assignee: Lear Automotive Dearborn, Inc., Southfield, Mich.

[21] Appl. No.: 08/868,312

[22] Filed: Jun. 3, 1997

[51] Int. Cl.[7] .................................................. D04H 1/00
[52] U.S. Cl. ........................... 442/364; 442/387; 442/388; 442/392; 442/402; 156/148; 28/104; 28/107
[58] Field of Search ................................. 442/364, 387, 442/388, 392, 402; 156/148; 28/104, 107

[56] References Cited

U.S. PATENT DOCUMENTS

| | | | |
|---|---|---|---|
| 1,923,512 | 8/1933 | Stein | 154/2 |
| 1,968,531 | 7/1934 | Ledwinka | 296/127 |
| 2,331,321 | 10/1943 | Heaton | 28/4 |
| 2,674,488 | 4/1954 | Lyijynen et al. | 296/137 |
| 2,763,586 | 9/1956 | Noyes | 154/53 |
| 3,042,446 | 7/1962 | Stahl | 296/137 |
| 3,126,978 | 3/1964 | Bergstrom | 181/33 |
| 3,160,549 | 12/1964 | Caldwell et al. | 161/161 |
| 3,212,811 | 10/1965 | Strasser | 296/137 |
| 3,265,530 | 8/1966 | Marzocchi et al. | 161/203 |
| 4,172,918 | 10/1979 | Doerer | 428/174 |
| 4,195,112 | 3/1980 | Sheard et al. | 428/288 |
| 4,211,590 | 7/1980 | Stewart et al. | 156/79 |
| 4,256,797 | 3/1981 | Stamper et al. | 428/215 |
| 4,320,167 | 3/1982 | Wishman | 428/288 |
| 4,352,522 | 10/1982 | Miller | 296/214 |
| 4,363,848 | 12/1982 | Le Duc et al. | 428/286 |
| 4,451,315 | 5/1984 | Miyazaki | 156/220 |
| 4,474,846 | 10/1984 | Doerer et al. | 428/284 |
| 4,610,478 | 9/1986 | Tervol | 296/214 |
| 4,741,945 | 5/1988 | Brant et al. | 428/158 |
| 4,840,832 | 6/1989 | Weinle et al. | 428/156 |
| 5,591,289 | 1/1997 | Souders et al. | 156/148 |

FOREIGN PATENT DOCUMENTS 1149270  4/1969  United Kingdom ............ D04H 1/42

*Primary Examiner*—Christopher Raimund
*Attorney, Agent, or Firm*—MacMillan, Sobanski & Todd, LLC

[57] ABSTRACT

An improved headliner material is formed of two layers formed from two types of polyester fibers. The polyester layers include both binder and non-binder fibers. The binder fibers are provided by an adhesive sheath that melts to secure the binder and non-binder fibers together. The layers are provided with different percentages of binder fibers. One layer is provided with 20% to 30% of binder fibers, with the remainder being non-binder fibers. This layer is less rigid, and provides loft and sound absorption to the headliner material. The other layer is provided with a greater percentage of binder fibers, and preferably, 40% to 60% binder fibers. This layer provides structure and rigidity to the headliner material.

14 Claims, 1 Drawing Sheet

VEHICLE HEADLINER FORMED OF POLYESTER FIBERS

BACKGROUND OF THE INVENTION

This invention relates to a vehicle headliner, which has at least two layers formed from distinct types of polyester fibers.

Vehicle headliners are utilized to provide sound absorption, and a desirable appearance in a vehicle cab. A headliner must provide a relatively rigid, lightweight component which has good sound absorption characteristics. Typically, a headliner is formed of several layers of different materials. Fiberglass is utilized in most headliners to provide strength and sound absorption. However, fiberglass is somewhat undesirable in that it is often uncomfortable to handle.

It would be desirable to create a headliner material which may be easily recycled. Typically, headliners utilize many different materials formed into layers which are bonded together. Scraps are cut away from the material to leave the final headliner shape. The scrap material is difficult to recycle as it includes many different materials. It would be desirable to form a headliner generally of a single type of material.

It has been proposed to form polyester fibers into a layer and use the layer as a headliner. The proposed material would include distinct types of polyester fibers mixed together in which a majority of the fibers are formed to have a binder sheath. A smaller percentage of the fibers are formed without the binder. The binder and non-binder fibers are mixed into a web, and the web is heated. The sheath binder melts to provide an adhesive to secure the binder and non-binder fibers. The proposed material did not utilize a polyester-based binder, and thus would not be fully recyclable.

In addition, the proposed material included only a single layer of polyester, and one optional decorative layer. Such a material would have some undesirable characteristics when used as a headliner.

SUMMARY OF THE INVENTION

In disclosed embodiments of this invention, a material for use as a headliner incorporates at least two distinct layers which are secured together. The layers are each made from polyester fibers including binder and non-binder fibers. Preferably, the binder fibers are formed with a sheath of a polyester-based melt adhesive. One of the layers is provided with a minority of its fibers being binder fibers and the majority being non-binder fibers. Preferably, the percentage of binder fibers is between 20% and 30%, and most preferably, 25%. Throughout this application, percentages are the percentage by weight of a particular type fiber in its layer.

The second layer is also provided by binder and non-binder polyester fibers, the binder fibers preferably formed by a polyester-based adhesive sheath. In the second layer there is a greater percentage of binder fibers than in the first layer. Preferably, the binder fibers comprise 40% to 60%, and most preferably, 50%. The second layer having the greater percentage of binder fibers provides rigidity to the overall material. The second layer is also self-supporting to provide a structured base and is resistant to deformation at temperature extremes. The first layer, having a lesser percentage of binder fibers, provides good sound absorption and loft characteristics.

In embodiments of this invention, the two layers are secured together by an adhesive layer, which is preferably a polyester adhesive. Alternatively, the two layers may be secured together by needling. Needling is a known method wherein needles punch through two layers to force fibers from the two to intermix and secure the two layers together.

In embodiments of this invention, a polyester-based decorative layer is positioned at an outer face of the headliner material. In other embodiments, a pair of the second material relatively rigid layers surrounds a layer of the first material with the small percentage of binder fibers. The decorative layer is positioned outwardly of one of the second material layers.

In other embodiments, reinforcement layers are positioned within the overall material. The reinforcement layers provide additional rigidity and strength. The reinforcement layers may be formed of polyester, and preferably, polyester having greater strength characteristics then the first two materials. Alternatively, the reinforcement layers may be formed of natural fibers, fiberglass or other materials with suitable characteristics.

These and other features of the present invention can be best understood from the following specification and drawings, of which the following is a brief description.

DETAILED DESCRIPTION OF A PREFERRED EMBODIMENT

Figure 1:
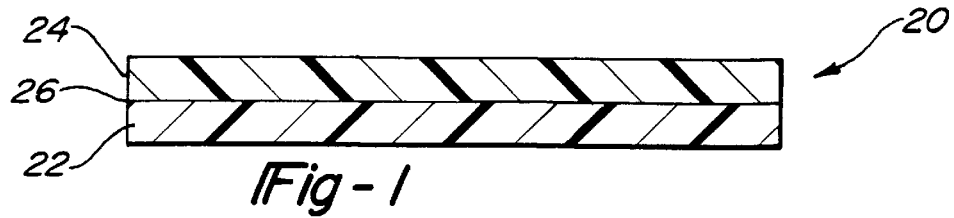
FIG. 1 shows a base material according to the present invention.

FIG. 1 shows a base headliner material 20. A first layer 22 is formed of a mixture of polyester fibers. A small percentage of the polyester fibers have a binder sheath at an outer periphery. Such sheathed fibers are known, and their construction forms no part of this invention. The remainder of the polyester fibers have no binder.

Preferably, the sheath is formed of a polyester adhesive. The fibers are mixed in a machine which converts the fibers into a non-woven mat. A suitable fiber mixing machine, is known in the art. The mat is then heated. Upon heating, the sheath fibers become wet, and stick to the non-binder fibers. Preferably, layer 22 has less than 50%, and more preferably between 20% and 30%, of its fibers provided with the sheath. The greater the percentage of fibers provided with a binder sheath, the greater the rigidity of the layer. In one embodiment, there were 25% binder fibers in layer 22.

A second layer 24 is also formed of a mix of binder and non-binder polyester fibers. The second layer has a greater percentage of binder fibers to provide greater rigidity to material 20. Preferably, 40% to 60% of the second layer is binder fibers. In one embodiment, there were 50% binder fibers and 50% non-binder fibers. The second layer is formed similarly as the first layer.

The fibers in the layers are preferably between 2 and 4 inches in length. In all embodiments set forth in this application, the binder fibers are preferably 2–4 denier. The non-binder fibers are preferably 15–20 denier.

The two layers 22 and 24 are secured together at an interface plane 26. In the base material shown in FIG. 1, the two layers are needled together. Essentially needles are punched through the layer for securing non-woven layers together.

The resulting headliner material 20 is provided with rigidity from the second layer 24, and good loft and sound absorption characteristics from the less rigid first layer 22.

Figure 2:
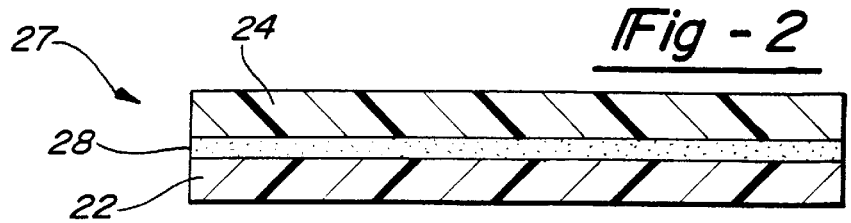
FIG. 2 shows an alternative to the material shown in FIG. 1.

FIG. 2 shows an embodiment 27 where an adhesive layer 28 is provided between layers 22 and 24. The adhesive 28 is preferably a polyester film adhesive which melts to secure the layers 22 and 24 together.

The layers 22 and 24 are heated and cooled before being secured to each other. The operative temperatures and steps for heating and cooling are known in the art. Thus, the binder fibers in each layer have already secured the non-binder fibers before the two layers are secured together.

Figure 3:
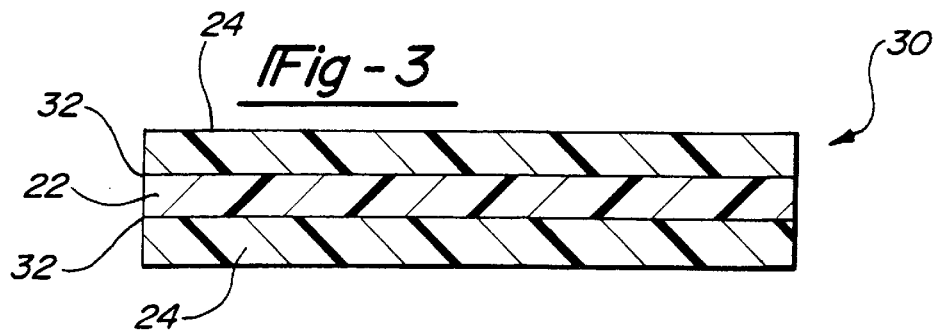
FIG. 3 shows another alternative embodiment.

FIG. 3 shows embodiment 30, wherein there are a pair of the more rigid second layers 24 mounted on each side of the less rigid first layer 22. Interface planes 32 secure the layers 22 and 24 together, and may be either an adhesive layer, or a needled connection as described above.

Figure 4:
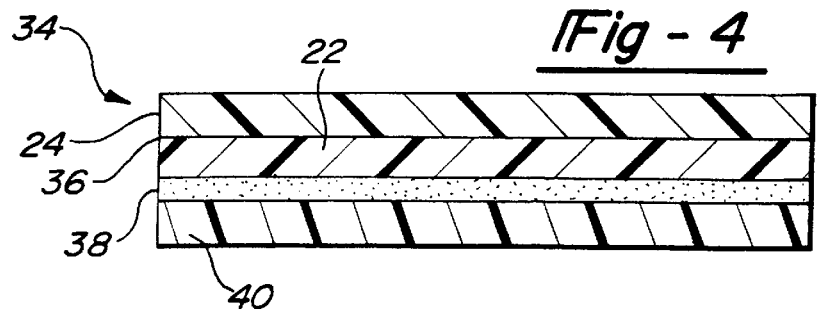
FIG. 4 shows another alternative embodiment.

FIG. 4 shows embodiment 34, wherein the layers 22 and 24 are secured together at plane 36, which may be needled or an adhesive layer. An adhesive layer 38, which is preferably a polyester film adhesive secures an outer decorative layer 40. The decorative layer 40 may be any of several known types of decorative fabrics, and is preferably formed entirely of materials which are polyester-based. The decorative layer may be a polyether foam and a polyester non-woven layer. Flame bonded or non-woven type materials are known and suitable for this application.

Figure 5:
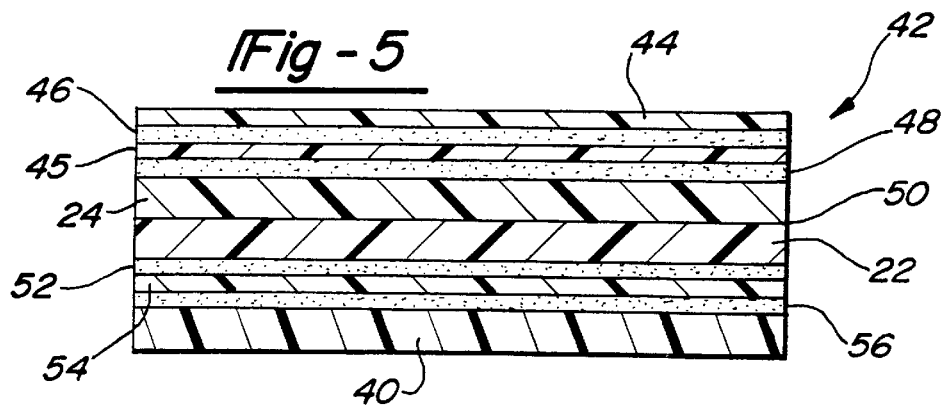
FIG. 5 shows another alternative embodiment.

FIG. 5 shows an embodiment 42 wherein the layers 22 and 24 are secured together at a plane 50, which may be needled or adhesive as described above. A non-woven scrim layer 44 is provided at an outer face of the material 42. Adhesive layer 46 secures the scrim layer 44 to a reinforcement layer 45. Adhesive layer 48 secures the reinforcement layer 45 to the layer 24, and an adhesive layer 52 secures the layer 22 to another reinforcement layer 54. An adhesive layer 56 secures reinforcement layer 54 to an outer decorative face 40. The decorative face 40 and layers 22 and 24 may be as described above. The adhesive layers are preferably polyester-based adhesive films. The reinforcement layers 45 and 54 may be formed of polyester fibers, which may be longer and heavier strands than those in the layers 22 and 24. Alternatively, the reinforcement layers may be formed of non-polyester materials. As an example, fiberglass or natural fibers such as jute, hemp of knaff may be utilized.

In all of the embodiments, the several layers are preferably formed independently, and then secured into the final material. The material is shaped and trimmed as known to form the desired headliner shape. Trimmed scrap material is easily recyclable as it is predominantly polyester.

In general, the present invention discloses a headliner material which consists either entirely, or at least predominantly, of polyester fibers. The use of the two layers having differing rigidities provides the headliner designer with the rigidity, sound absorption and loft characteristics desired for headliners. In addition, the material is recyclable, light weight, and relatively inexpensive.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A vehicle headliner comprising:
    a first layer formed of polyester fibers including some fibers formed with a binder sheath, and some formed with no binder sheath, said first layer having 20%–30% by weight of binder fibers; and
    a second layer formed of polyester fibers, said second layer also including some fibers formed with a binder sheath, and other fibers formed with no binder sheath, the percentage of fibers formed with a binder in said second layer having 40%–60% by weight binder fibers such that said second layer provides greater rigidity than said first layer and said first layer provides greater loft than said second layer.

2. A headliner as recited in claim 1, wherein another rigid layer constructed to have a greater percentage of binder fibers than said first layer is included with said other rigid layer and said second layer being positioned on opposed faces of said first layer.

3. A headliner as recited in claim 1, wherein said first and second layers are secured by an intermediate polyester adhesive.

4. A headliner as recited in claim 1, wherein reinforcement layers are provided in said headliner in addition to said first and second layers.

5. A headliner as recited in claim 4, wherein said reinforcement layers are formed of natural fibers.

6. A headliner as recited in claim 4, wherein said reinforcement layers are formed of polyester materials.

7. A headliner as recited in claim 1, wherein said first and second layers are secured by an intermediate adhesive layer.

8. A headliner as recited in claim 1, wherein said first and second layers are secured by needling.

9. A headliner as recited in claim 1, wherein said fibers in both said layers are in a range of 2–4 inches in length.

10. A headliner as recited in claim 1, wherein said binder fibers are in a range of 2–4 denier and said non-binder fibers are in a range of 15–20 denier.

11. A headliner as recited in claim 10, wherein there being no layers having a higher percentage of binder layers between said first layer and said decorative layer.

12. A headliner as recited in claim 1, wherein a decorative outer layer is attached to said headliner, said decorative outer layer being closer to said first layer than to said second layer.

13. A method of forming a headliner comprising:
    1) forming a first layer by mixing polyester fibers formed with a binder sheath with other polyester fibers without a binder sheath to form a web, said mixing including a 20–30 percentage by weight of binder fibers, heating said web to wet said sheaths and allowing said web to cool;
    2) forming a second layer by mixing polyester fibers formed with a binder sheath with other polyester fibers without a binder sheath to form a web, said mixing including a 40–60 percentage by weight of binder fibers, heating said web to wet said sheaths and allowing said web to cool; and
    then securing said first and second layers together.

14. A method as recited in claim 13, wherein a decorative layer is secured to said headliner, and said decorative layer being closer to said first layer than to said second layer.

* * * * *